United States Patent [19]

Christopher

[11] Patent Number: 4,519,861
[45] Date of Patent: May 28, 1985

[54] METHOD FOR MANUFACTURING A FIBER-REINFORCED PUSH OR PULL ROD

[75] Inventor: Hans-Günther Christopher, Berlin, Fed. Rep. of Germany

[73] Assignee: Siemens Aktiengesellschaft, Berlin and Munich, Fed. Rep. of Germany

[21] Appl. No.: 466,491

[22] Filed: Feb. 15, 1983

[30] Foreign Application Priority Data

Feb. 17, 1982 [DE] Fed. Rep. of Germany ....... 3206088
Dec. 20, 1982 [DE] Fed. Rep. of Germany ....... 3247889

[51] Int. Cl.³ .............................................. B29D 23/12
[52] U.S. Cl. ................................. 156/172; 156/161; 156/162; 156/171; 174/178; 174/189
[58] Field of Search ............... 156/169, 429, 171, 172, 156/173, 217, 218, 184, 162, 161; 174/178, 179, 181, 180, 182, 183, 184, 189

[56] References Cited

U.S. PATENT DOCUMENTS 3,801,401 4/1974 Cope .................................. 156/172
4,127,741 11/1978 Bauer .................................. 174/189

Primary Examiner—Marion E. McCamish
Assistant Examiner—Edward J. Dalgewicz, III
Attorney, Agent, or Firm—Kenyon & Kenyon

[57] ABSTRACT

A process for manufacturing a fiber-reinforced push or pull rod formed of electrically insulating plastic material having flange fittings fastened to respective ends thereof. The push or pull rod is formed preferably as a hollow cylinder, and the flange fittings are adapted for transmitting compression or tension forces. A plurality of threads are arranged in parallel with each other and an axis of the rod; which threads are then impregnated with a hardenable plastic material. In accordance with the invention, the tensile strength of the rod is improved by wrapping the threads about at least one pair of wires which are arranged substantially parallel and at a distance with respect to each other so as to form a tape wherein the wires form the edges of the tape. The wires, as tape edges, are inserted into helical external recesses of the flange fittings and are secured therein in a form-locking manner.

8 Claims, 10 Drawing Figures

METHOD FOR MANUFACTURING A FIBER-REINFORCED PUSH OR PULL ROD

BACKGROUND OF THE INVENTION

This invention relates generally to methods for manufacturing rods formed of electrically insulating plastic material, and more particularly, to a method for manufacturing a fiber-reinforced, hollow-cylindrical push or pull rod formed of electrically insulating material and having flange fittings fastened at end faces thereof for transmitting compression or tension forces; the fibers being formed of threads which are oriented parallel to the axis of the rod and are impregnated with hardenable plastic material.

Push or pull rods formed of insulating material are used as force-transmitting members in high voltage circuit breakers. In such circuit breakers, the contacts across the switching gaps are at high voltage potentials, and are actuated by a drive at ground potential. One particular hollow, cylindrical push or pull rod which is known is described in DE-AS No. 24 29 475. In this known rod, sleeves are provided in the vicinity of the end faces as force transmitting members which cover the areas of the tube wall of the rod at the end faces. The sleeves are connected by a close fit to the rod by elements of structure which are inserted into the outer layer of the rod, project radially beyond the tube wall, and engage in recesses in the sleeves. This known push or pull rod is made by a process essentially in which a fabric having threads oriented parallel and transversely to the axis of the rod is impregnated with electrically insulating plastic material of the type which is hardenable. The wrapping process may be of a wet type, or a dry wrapping process wherein the wrap is subsequently impregnated.

It is a problem with such known rods that even if high tensile strength threads are used, the rod can be stressed in compression or tension only to the extent that the form-locking connection between the sleeve and the outer layer of the rod can be stressed in shear. It is, therefore, an object of this invention to provide a method for manufacturing a fiber-reinforced push or pull rod wherein the tensile strength of the rod is relatively large and limited essentially by the tensile strength of the threads which are oriented parallel with the axis of the rod.

SUMMARY OF THE INVENTION

The foregoing and other objects are achieved by this invention which provides a method for manufacturing a fiber-reinforced push or pull rod wherein the threads are wound on at least one pair of wires which are arranged to be substantially parallel and at a predetermined distance from each other. The method further includes the forming of a tape wherein the wires form the edges of the tape, placing the wires in helical external recesses contained in conical fittings, and securing the wires therein in a form-locking manner.

It is evident that since the threads are connected directly to the conical fittings in a form-locking manner, the combination of the conical fittings and the multiplicity of threads which extend therefrom in a substantially parallel relationship with the axis of the rod, form a composite body after the plastic material has hardened. The threads cooperate primarily in the transmission of force between the push or pull rod and the fitting, while the impregnating or shaping plastic material participates only indirectly. The push or pull wire which results from the inventive method is substantially less susceptible of having its fittings torn-off under high tensile strength than known rods.

In accordance with a further embodiment of the invention, the recesses in the fittings can be rolled closed or beaded-over in the direction of the tension of the thread after the wires which form the edges of the tape are placed therein. In a simple mechanism, the projecting portions of the helical recesses, or their boundaries, which are rolled-over in accordance with the present inventive process, constitute a particularly advantageous and simply locking arrangement wherein the transmission of the pulling forces can be selected independently of the tensile strength of the wires.

In accordance with the inventive method, the wrapping can be performed rapidly if the wires are wrapped with groups of parallel threads. It is therefore advantageous that the threads be drawn from a revolving transporting device, illustratively a carousel with a spool, and that they be wound about the spaced wires through a wire guide arranged at a point on the circumference of the transporting device.

It is a feature of the present invention that the threads are stretched to extend between conical fittings in an arrangement which is concentric about the rods axis of reciprocating motion. Thus, the threads are secured in a form-locking manner in recesses of the fittings which extend transversely with respect to the axis of the rod. Each such stroke has a length which corresponds to the length of the rod. By this method, the conical fittings and the multiplicity of threads stretched substantially parallel to the axis of the rod form a composite body after the plastic material has set and threads have been connected directly to the fittings in a form-locking manner.

It is a further feature of this invention that the threads participate primarily and directly in the transmission of force between the push or pull rod and the fitting, while the impregnating, or shaping, plastic material participates only indirectly. Thus, the danger of the fittings being torn-off under high pulling forces is substantially eliminated with this solution.

It a particularly advantageous embodiment of the invention, the recesses are formed by circular slots into which a spring ring is inserted for securing the threads. Alternatively, wires, stranded wires, ribbons, or other flexible tying devices can be used to secure the threads.

In accordance with a further embodiment of the invention, the fitting is made of several parts, each of which can have a recess. Such parts of the fitting can be stacked successively after each stroke motion and fixation of the threads.

BRIEF DESCRIPTION OF THE DRAWINGS

Comprehension of the invention is facilitated by reading the following detailed description in conjunction with the annexed drawings, in which.

DETAILED DESCRIPTION

Figure 1:
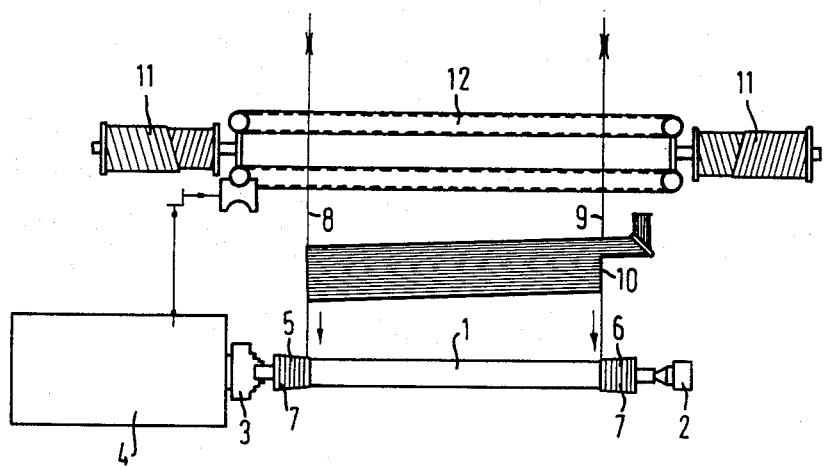
FIG. 1 is a schematic representation of an arrangement which is useful for performing the method in accordance with the invention.

FIG. 1 is a schematic representation of a winding arbor 1 which is provided to facilitate performance of the present inventive method. Winding arbor 1 is advantageously adapted to have a length corresponding to that of a preferably hollow, cylindrical push or pull rod. The winding arbor is rotatably supported on one side thereof in a tail stock 2, and is clamped on the other side in a chuck 3 which is rotatable driven by a drive 4. Conical fittings 5 and 6 are arranged at respective ends of winding arbor 1. The conical fittings are provided with helical external recesses 7 such that a wire 8 can be inserted into recess 7 of conical fitting 5, while a wire 9 is introduced into recess 7 of conical fitting 6. Wires 8 and 9 are arranged to be substantially parallel with one another and become spaced further apart when they are wound up.

Threads 10 are wound about wires 8 and 9; such threads being advantageously formed of high tensile-strength plastic fibers. The threads are taken from a carousel 12 which contains a plurality of spools 11. When the carousel is rotated, the threads are wound to form a tape which has edges formed by wires 8 and 9. Wires 8 and 9, being thus wrapped by threads 10, are then placed in helical external recesses 7 of conical fittings 5 and 6, and secured therein in a form-locking manner. After wires 8 and 9 which form the tape edges are inserted, recesses 7 can be rolled closed, or at least partially closed, in the direction of the tension of the thread. Such wrapping of the wires in groups by substantially parallel threads facilitates rapid rates of production.

It is evident from the foregoing and from FIG. 1 that the diameter of carousel 12 depends upon the length of the push or pull rod which is to be manufactured. It may therefore be advantageous in the production of long rods to utilize a different transporting arrangement, illustratively a chain or a belt, instead of carousel 12. The use of a chain or belt in the production of long push or pull rods saves substantial space.

Figure 2:
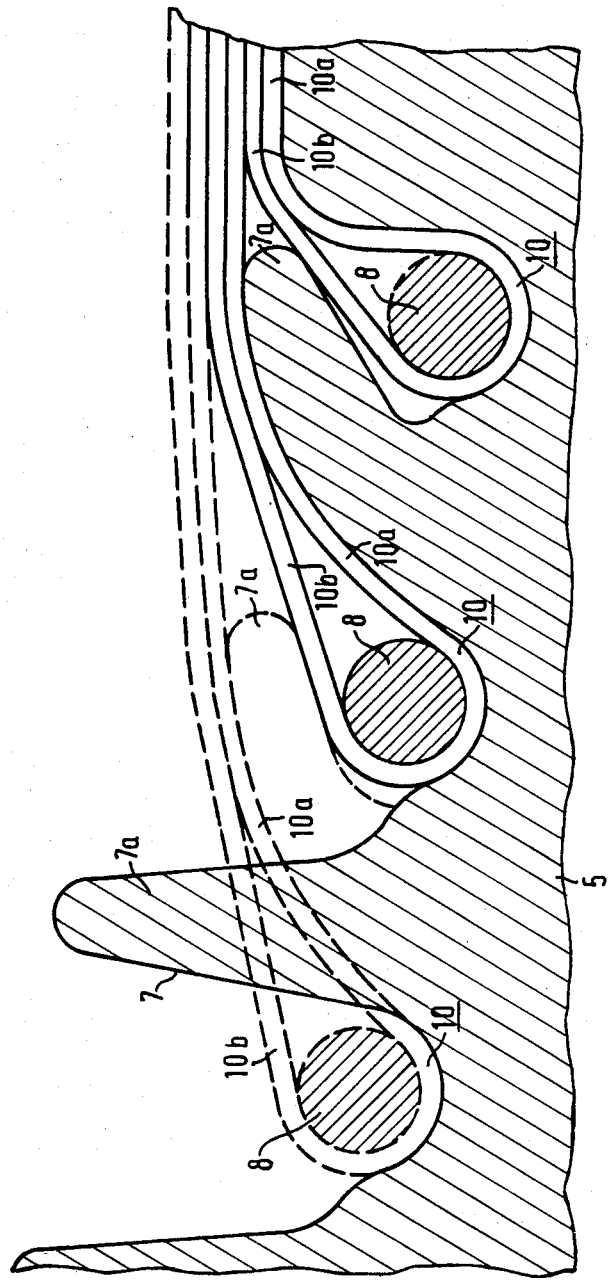
FIG. 2 is a cross-sectional representation of a portion of the fitting showing the threads engaged therewith, and in accordance with FIG. 1.

FIG. 2 is a cross-sectional representation of the detail of FIG. 1 showing wire 8 inserted into helical recesses 7. Three turns of wire 8 are shown with looped-around threads 10a and 10b. The detail of FIG. 2 further shows that the conical angle of end fitting 5 in this presentation and the pitch of the thread-like helical recess 7 are adapted to the diameter of the thread, taking into consideration the two parallel threads 10a and 10b of each loop, so as to achieve the closest possible packing of the threads. This figure further shows the particularly well formed locking arrangement which is achieved by rolling-over the helical recesses 7 or their limiting bodies 7a. Such rolling-over securely anchors threads 10a and 10b, and wire 8, in recesses 7. In a preferred embodiment, the recess is preferably rolled closed in the direction of tension of the thread, as shown in FIG. 2.

In a further embodiment of the invention, a plurality of parallel pairs of wires can be provided if the end fittings are provided with multiple screw threads. Thus, in such an embodiment several parallel wires can be inserted simultaneously in respective helical recesses in each conical fitting.

Figure 3:
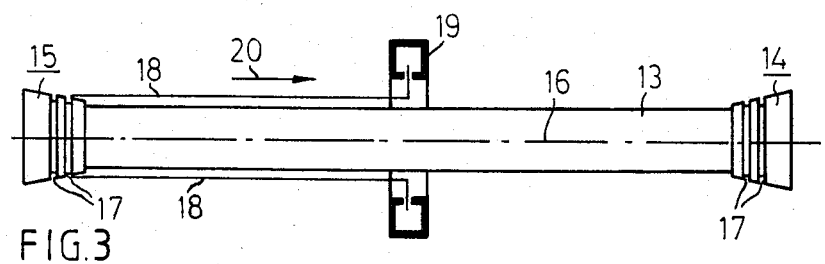
FIGS. 3 to 7 are schematic representations of certain steps in an embodiment of the process of the invention.
Figure 4:
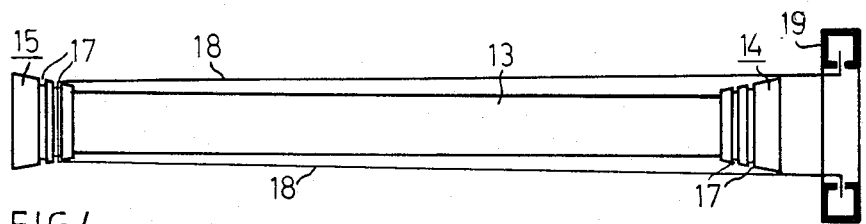

FIGS. 3 to 7 show various stages in the performance of the inventive method. As shown in these figures, a receiving arbor 13, which is adapted to the length of the preferably hollow cylindrical push or pull rod, is rotatably supported and driven by a drive which is not shown in detail in these figures. Receiving arbor 13 is provided with conical fittings 14 and 15 which are mounted on respective ends thereof and which are provided with groove-like recesses 17 which extend transversely with respect to an axis 16 of the rod. The threads are first anchored at fitting 15 in slot 17 and are then stretched toward fitting 14 by a ring-shaped thread guide 19. Thread guide 19 arranges the threads concentrically about axis 16 between the conical fittings and is supported so as to be movable in a reciprocating motion. At fitting 14, the threads 18 are secured in a recess 17, whereupon the ring-shaped thread guide 19 executes a stroke motion in the direction of arrow 20. The motion of ring-shaped thread guide 19 in the direction of arrow 20 is illustrated in FIGS. 3 and 4.

Figure 5:
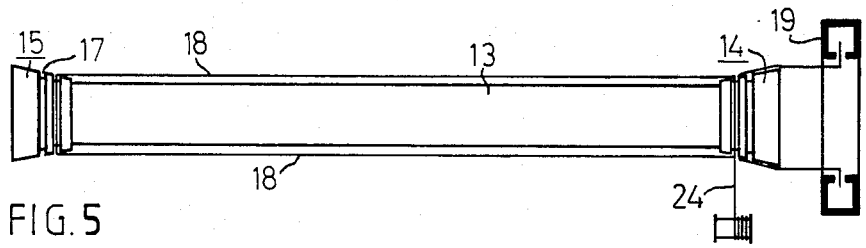

FIG. 5 shows thread guide 19 arranged beyond conical fitting 14 in the direction of arrow 20. While thread guide 19 is at this location, threads 18 are secured to conical fitting 14. In this embodiment, a flexible tying wrap 24, which may be a spring ring, a stranded wire, or any other flexible tying wrap which can take tension forces, is wrapped around the threads so as to secure them within recess 17. Of course, tying wrap 24 may be a thread similar to threads 18.

Figure 6:
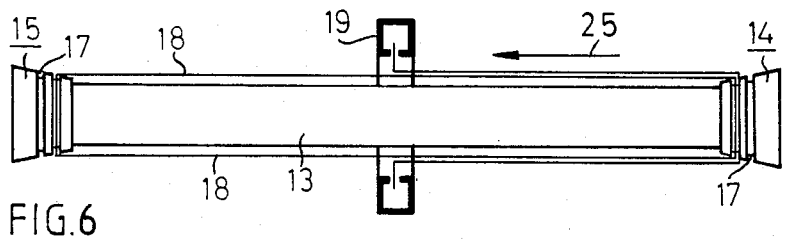
Figure 7:
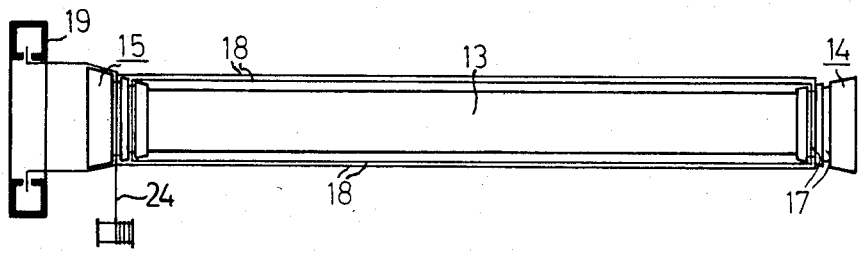

After threads 18 are secured in recess 17, thread guide 19 is moved in the direction of arrow 25 toward conical fitting 15. As shown in FIGS. 5 and 6, the operation of securing the threads in a recess 17 with a tying wrap 24 is repeated in the mannner discussed hereinabove.

Figure 8:
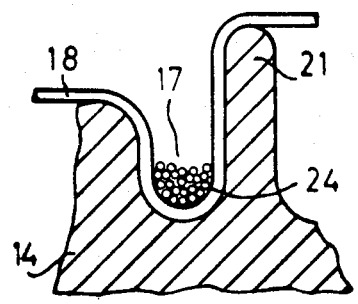
FIGS. 8 to 10 are cross-sectional representations of illustrative embodiment examples of the connection between the threads and an armature.
Figure 9:
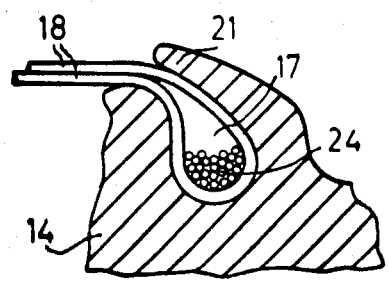

FIGS. 8 and 9 are detailed cross-sectional representations of threads 18 secured by tying wrap 24 in a recess 17 of conical fitting 14. FIG. 8 shows thread 18 after being secured as shown in FIG. 5. Thus, thread 18 continues to extend to the right, in the direction of arrow 20. FIG. 9 shows a limiting body 21 of conical fitting 14 having been bent or rolled over to close the recess.

Figure 10:
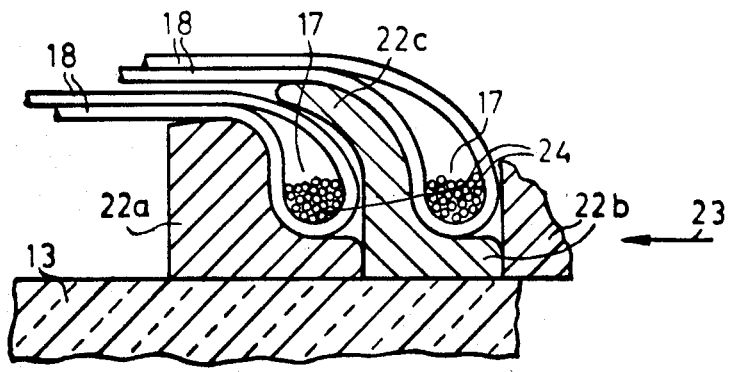

FIG. 10 is a cross-sectional representation of a concical fitting, such as one of fittings 14 and 15, which is formed of several fitting portions, such as fitting portions 22a and 22b. In this embodiment, the recesses are formed by the coaxially adjacent relationship between fitting portions 22a and 22b, respectively. In the specific illustrative embodiment, fitting portion 22b is provided with a projecting edge 22c which is bent or rolled over to provide the form-locking effect. Thus, in accordance with FIG. 10, after threads 18 are secured in slot 17 of fitting portion 22a, fitting portion 22b is installed over winding arbor 13 in the direction of an arrow 23. In this manner, a selectable number of fitting portions corresponding to the number of desired thread layers can be installed.

Although the invention has been described in terms of specific embodiments and applications, persons skilled in the art, in light of this teaching, can generate additional embodiments without exceeding the scope or departing from the spirit of the claimed invention. For example, the present process invention which is described in terms of a continuous process cycle and an intermittent process cycle is adaptable for either wet wrapping, or for a dry wrapping method with subsequent impregnation. Accordingly, it is to be understood that the drawings and descriptions in this disclosure are proffered to facilitate comprehension of the invention and should not be construed to limit the scope thereof.

What is claimed is:

1. A method for producing a fiber-reinforced push or pull rod formed of electrically insulating plastic material, the push or pull rod being of the type provided with fittings fastened at respective ends thereof for transmitting compression and tension forces, and wherein the fibers are formed of threads which are oriented parallel to an axis of the rod and are impregnated with a hardenable plastic material, the method comprising the further steps of:

forming a pair of fittings each having a longitudinal axis of symmetry and, on an external surface, a grooe with at least one portion disposed substantially in a plane oriented substantially transversely to the longitudinal axis of symmetry of the respective fitting;

winding the threads about a pair of wires arranged to be parallel and at a predetermined distance from one another so as to form a tape wherein the wires form the edges thereof;

inserting the wires at the edges of the tape into respective grooves of the fittings; and securing the wires in the grooves in a form-locking manner.

2. The method of claim 1 wherein there is provided the further step of closing the recesses in the direction of tension of the threads after the wires which form the edges of the tape are inserted.

3. The method of claim 1 wherein said step of wrapping is performed with groups of parallel threads.

4. The method of claim 1 wherein there is further provided the step of taking the thread from a revolving transporting device having at least one spool of the thread, and said step of wrapping utilizes a thread guide arranged at one point on the circumference of a transporting device.

5. A method for producing a fiber-reinforced push or pull rod formed of electrically insulating plastic material, the push or pull rod being of the type provided with fittings fastened at respective ends thereof for transmitting compression and tension forces, and wherein the fibers are formed of threads which are oriented parallel to an axis of the rod and are impregnated with a hardenable plastic material, the method comprising the further steps of:

forming a pair of fittings each having at least one recess on an external surface;

stretching, in a stroke of a reciprocating motion, the threads in an arrangement which is concentric with respect to the axis of the rod between the fittings; and securing the threads in the recesses of the fittings, alternatingly after each stroke of the reciprocating motion, each such stroke motion corresponding to the length of the rod.

6. The method of claim 5 wherein the recesses are in the form of circular slots and there is further provided the step of inserting a spring ring into a recess for securing the threads.

7. The method of claim 5 wherein the recesses are formed as circular slots and there is further provided the step of wrapping a flexible tying wrap in a recess for securing the threads.

8. The method of claim 5 wherein a fitting is made of several fitting portions, each such fitting portion having a recess therein, and there is further provided the step of stacking additional ones of said fitting portions after each stroke motion and after performing said steps of stretching and securing.

* * * * *